United States Patent [19]

Maher et al.

[11] Patent Number: 5,767,670
[45] Date of Patent: Jun. 16, 1998

[54] METHOD AND APPARATUS FOR PROVIDING IMPROVED TEMPERATURE COMPENSATED OUTPUT FOR VARIABLE DIFFERENTIAL TRANSFORMER SYSTEM

[75] Inventors: Thomas R. Maher, Plainville; Keith W. Kawate, Attleboro Falls, both of Mass.

[73] Assignee: Texas Instruments Incorporated, Dallas, Tex.

[21] Appl. No.: 705,491

[22] Filed: Aug. 29, 1996

[51] Int. Cl.⁶ .................. G01B 7/14; G01B 7/30; G01D 3/02; G01D 5/22
[52] U.S. Cl. .................. 324/207.12; 324/207.18; 324/207.25; 340/870.36
[58] Field of Search .................. 324/207.12, 207.17, 324/207.18, 207.19, 207.25, 225, 234, 236, 239, 241; 340/870.31, 870.32, 870.33, 870.34, 870.35, 870.36

[56] References Cited

U.S. PATENT DOCUMENTS

| | | | |
|---|---|---|---|
| 4,876,899 | 10/1989 | Strott et al. | |
| 5,180,979 | 1/1993 | Frazzini et al. | 324/207 |
| 5,247,253 | 9/1993 | Bowman | 324/207 |
| 5,334,932 | 8/1994 | Nielsen | 324/225 |

FOREIGN PATENT DOCUMENTS

| | | |
|---|---|---|
| 646774 | 4/1995 | European Pat. Off. |
| WO-A-9414027 | 6/1994 | WIPO |

Primary Examiner—Walter E. Snow
Attorney, Agent, or Firm—Russell E. Baumann; Richard L. Donaldson; René E. Grossman

[57] ABSTRACT

A variable differential transformer system (10), both linear and rotary (L/RVDT) includes a primary coil (12) drive by a primary drive (20) having a triangle wave generator whose frequency is set by an external frequency control ($R_{osc}$ and $C_{osc}$) which provides compensation for gain temperature error. Secondary coils (14, 16) have a common connection for balanced loading with an input stage arrangement (R7, R8, R9, R10) providing low common mode range and a way to differentiate between normal operation and coil faults detected by a fault detection network (28). Synchronous demodulation (22) extracts both magnitude and direction from the secondary coil signals. Electronic calibration (24) compensates for sensor offset and adjust circuit gain by adding a percentage of the synchronous demodulation reference waveform to the secondary differential voltage. A filter network (26) averages the synchronous demodulated signal in order to extract the DC component of the waveform which is amplified (30) to provide drive current to interface with external loads. A variable rotary core assembly (18) and a variable linear core assembly (18') are shown which allow axial adjustment of the core relative to the coils to provide balancing of the out-of-phase component of the secondary voltage waveform to provide offset temperature error compensation without significantly affecting the in-phase component of the secondary waveform.

15 Claims, 6 Drawing Sheets

METHOD AND APPARATUS FOR PROVIDING IMPROVED TEMPERATURE COMPENSATED OUTPUT FOR VARIABLE DIFFERENTIAL TRANSFORMER SYSTEM

BACKGROUND OF THE INVENTION

This invention relates generally to variable differential transformer sensor systems and more particularly to apparatus and methods for compensating for temperature induced errors in such systems.

Variable differential transformer sensor systems comprise a primary coil driven by an AC source magnetically coupled to first and second secondary coils with a conductive ferromagnetic core or sensing element movably mounted within the magnetic loops formed among the coils. As the core moves in response to a physical phenomena being measured in a linear path in linear systems (LVDTs) and in a rotary path in rotary systems (RVDTs) such movement is converted into an electrical signal. Conditioning electronics convert the sensing element signal into a suitable output, for example, a proportional DC voltage. Typically, the primary coil is driven by an AC current source with the intent that the current source will produce a constant magnetic field independent of temperature which, in turn, will produce a constant, temperature stable voltage across the secondaries. However, magnetic circuit parametric changes over temperature, such as inductance, permeability, and resistance (eddy current loss) of the components of the system including the coils, core, and related shields, affect the coupling of the magnetic field to the secondaries and hence result in temperature dependent secondary voltages. There are two types of temperature induced error in a variable differential transformer system, gain and offset. Gain temperature error is defined as a change in slope of the output vs. temperature, while offset temperature is defined as the change in output at zero core deplacement.

Standard compensation schemes for offset and gain temperature error require additional components and complex, costly temperature calibration procedures. Such schemes make use of thermistors with adjustable electronics to select the amount of temperature compensation needed for each individual sensor. Standard compensation techniques also require that the sensor be tested at several temperatures to determine the correct amount of compensation. It is an object of the present invention to provide apparatus and methods for producing temperature stable secondary voltages and, therefore, a temperature stable variable differential transformer output. It is another object of the present invention to produce a temperature stable L/RVDT sensor system without the need for additional external components and without the need to test each sensor system at several temperatures.

Yet another object of the invention is to provide an improved temperature stable linear and rotary variable differential transformer system which is relatively inexpensive to produce and to calibrate. Still another object is to provide a sensor which overcomes the prior art limitations noted above which displays improved accuracy and reliability in use. Another object is the provision of a sensor system particularly useful in sensing torque for applications such as in automotive power sensing systems.

SUMMARY OF THE INVENTION

Briefly, in accordance with the invention, temperature stable secondary voltages are obtained by providing a temperature dependent magnetic field which compensates for magnetic circuit parameter changes over temperature. In accordance with the invention, the primary coil is driven with an AC voltage source providing an AC current that is a function of temperature. The temperature coefficient of resistivity (TCR) of the coil wire is used to affect the AC primary current as a function of temperature and the frequency of the AC source is varied to affect the ratio of the resistive portion to the reactive portion of the primary coil winding and, therefore, the temperature coefficient of the primary current, providing gain temperature compensation.

With respect to offset temperature compensation the secondary waveforms are phase-shifted to reduce the offset temperature error. To explain this, it should first be noted that the output of a linear/rotary variable differential transformer is measured by taking the difference between the outputs of the two secondary coils. The output can be broken up into two perpendicular components, an in-phase (IP) component and an out-of-phase (OP) component. The IP component is defined as the portion of the L/RVDT output that is in phase (0 degrees phase-shift) with the individual secondary while the OP component is defined as the portion of the L/RVDT output that is phase-shifted from the IP component by 90 degrees. Synchronous demodulation can be used to extract each component by using a secondary waveform as the IP synchronous demodulation reference, and a 90 degree phase-shifted waveform for the OP synchronous demodulation reference.

The output of an L/RVDT based sensor is proportional to the IP component, while conventionally the OP component is essentially ignored. The goal of any temperature compensation approach is to eliminate the temperature dependence of the IP component.

It has been found that the offset temperature error of the IP component is proportional to the initial (ambient temperature) magnitude of the OP component and is independent of initial magnitude of the IP component. In accordance with the invention, the OP components in the two secondaries are balanced by phase-shifting the secondary waveforms thereby reducing the offset temperature error of the IP component and concomitantly the offset temperature error of the sensor output. According to a feature of the invention, the OP components are balanced by adjusting the axial position of the coil relative to the position of the core. The OP component is affected by the adjustment without any significant impact on the IP component. According to another feature of the invention, with respect to an RVDT system, the core comprises two halves rotatably mounted relative to one another with each half having pairs of long and short teeth extending from a base member. The base member is extended in width on either side of a shield extending over the coils so that axial movement of the core has minimal effect on the shield to core air-gap reluctance. The gap between the core base and the shield is kept small relative to the width of the target base and the width of the target base is made large compared to the amount of axial movement.

Phase-shifting of the secondaries can also be accomplished by other means, such as by adjusting the axial position of a conductive and/or magnetic disk or sleeve within the magnetic loops, and by other mechanical as well as by electrical methods.

BRIEF DESCRIPTION OF THE DRAWINGS

Other objects, advantages, and details of the novel and improved sensor system of this invention appear in the following detailed description of preferred embodiments of the invention, the detailed description referring to the drawings in which:

3

Figure 1:
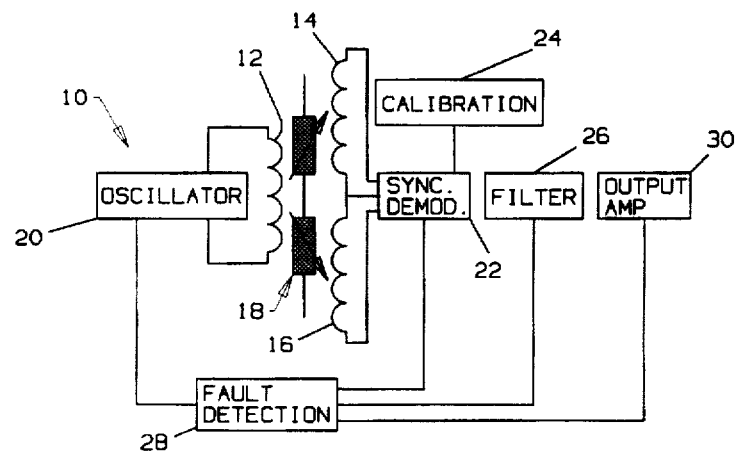
Figure 2:
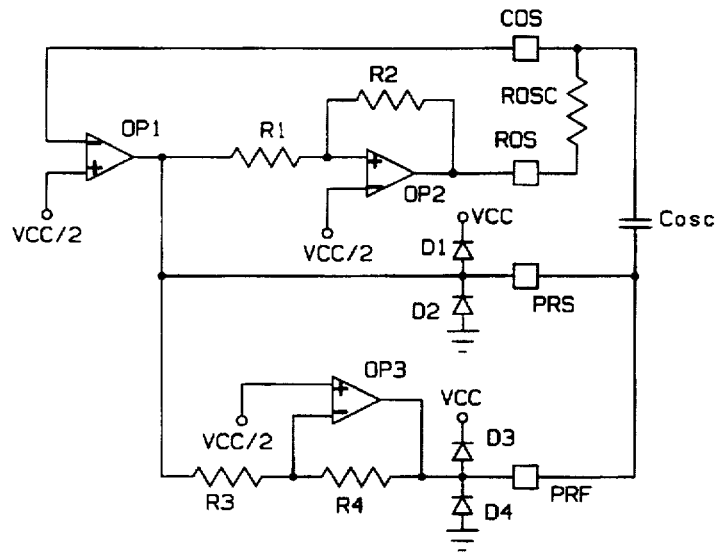
Figure 2A:
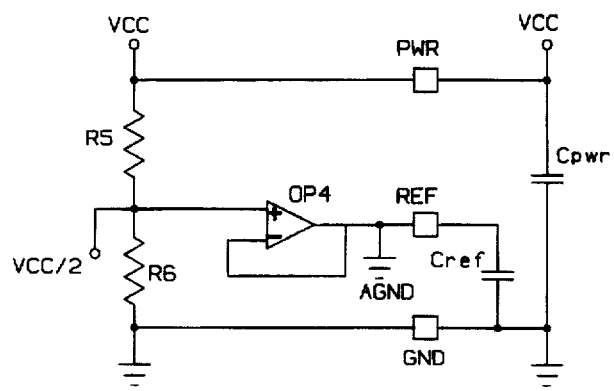
Figure 3:
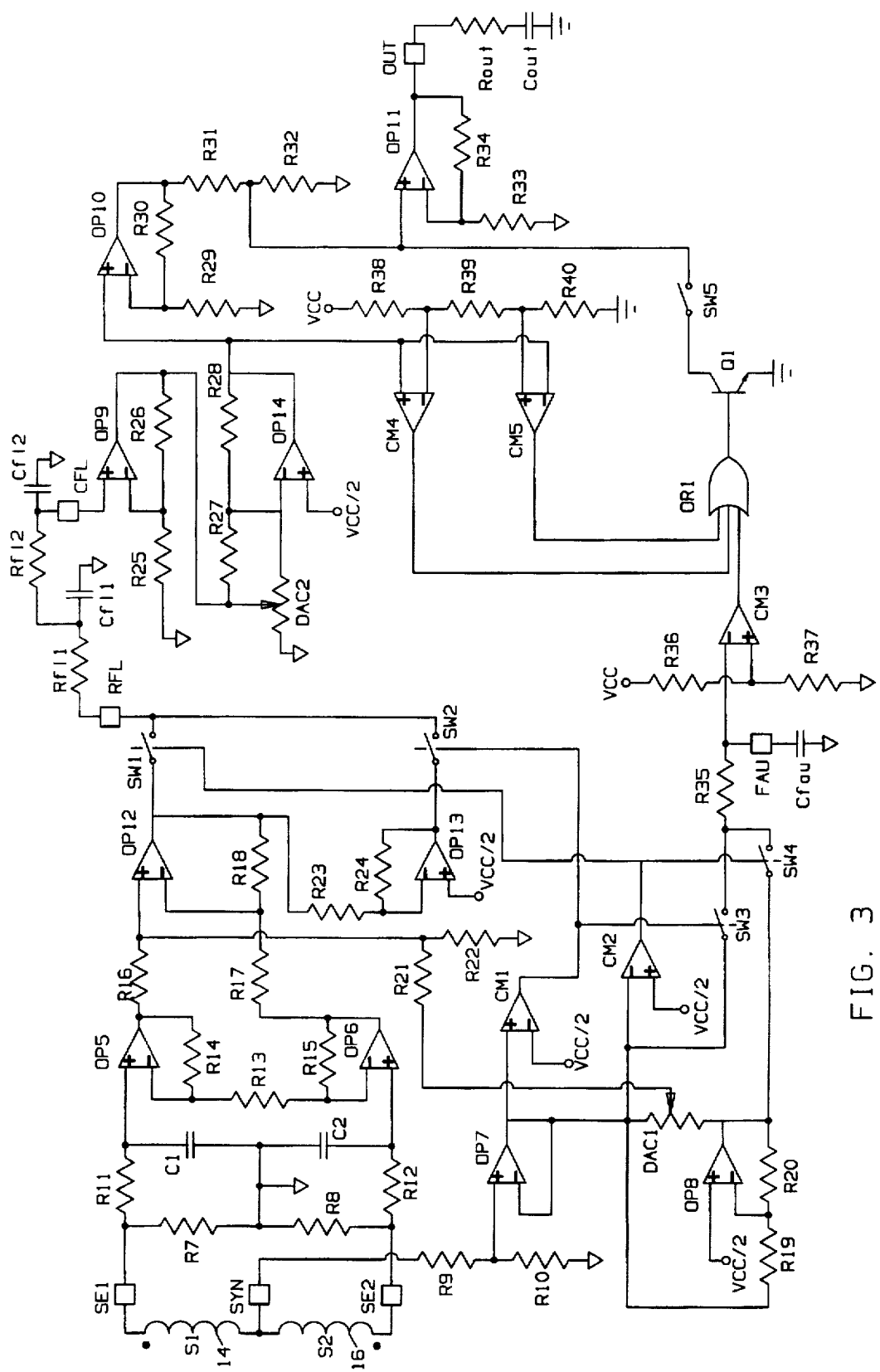
Figure 4:
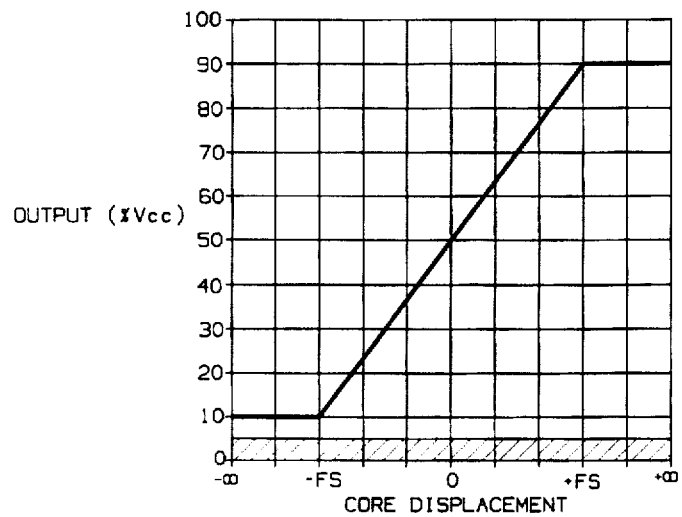
Figure 5:
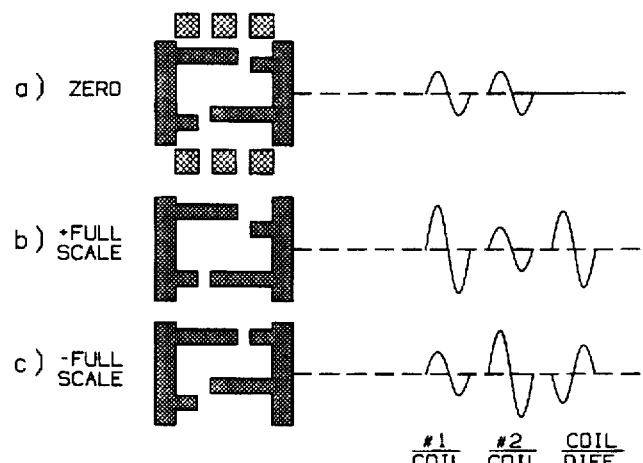
Figure 6:
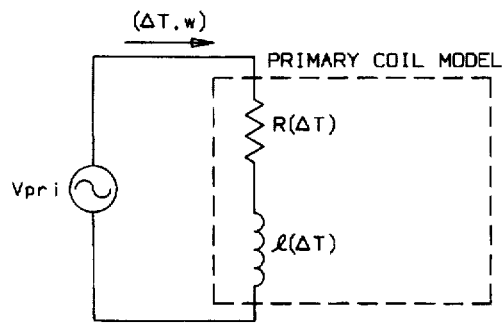
Figure 7:
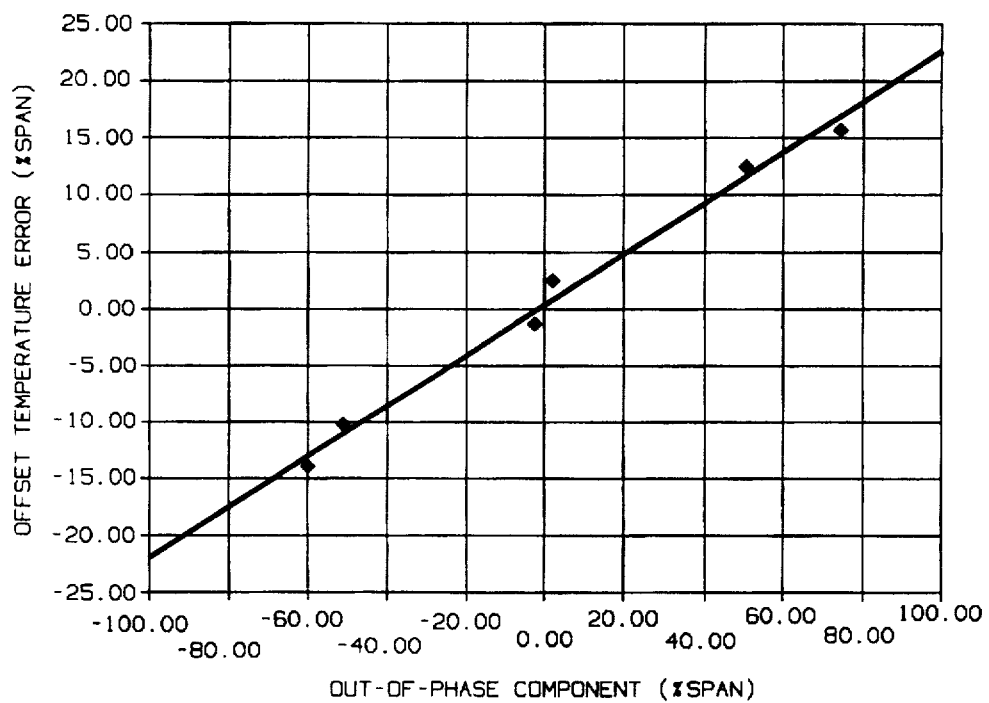
Figure 8:
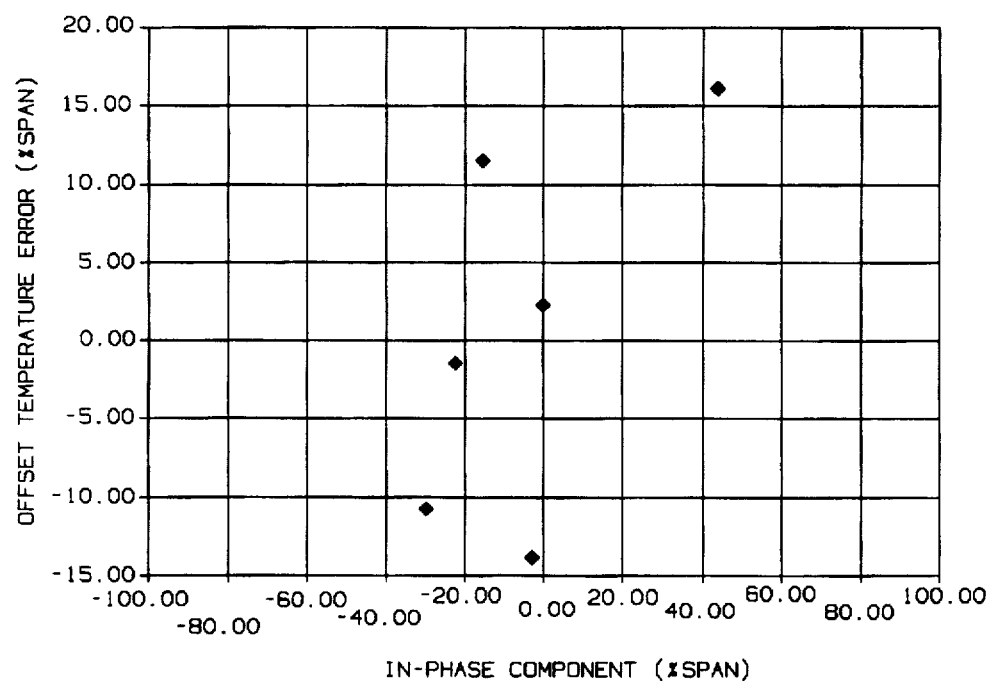
Figure 9:
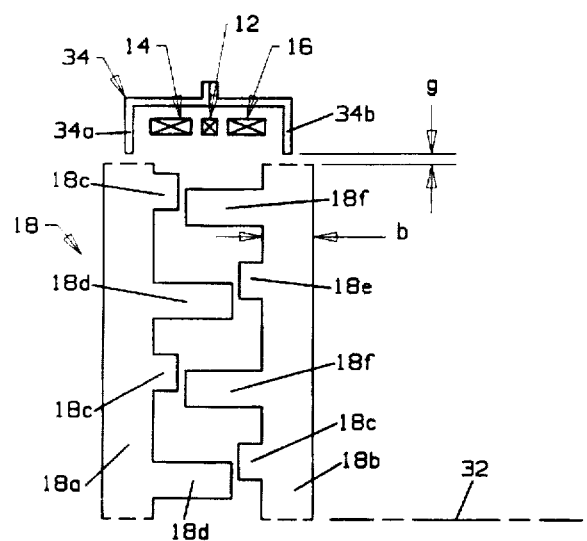
Figure 10:
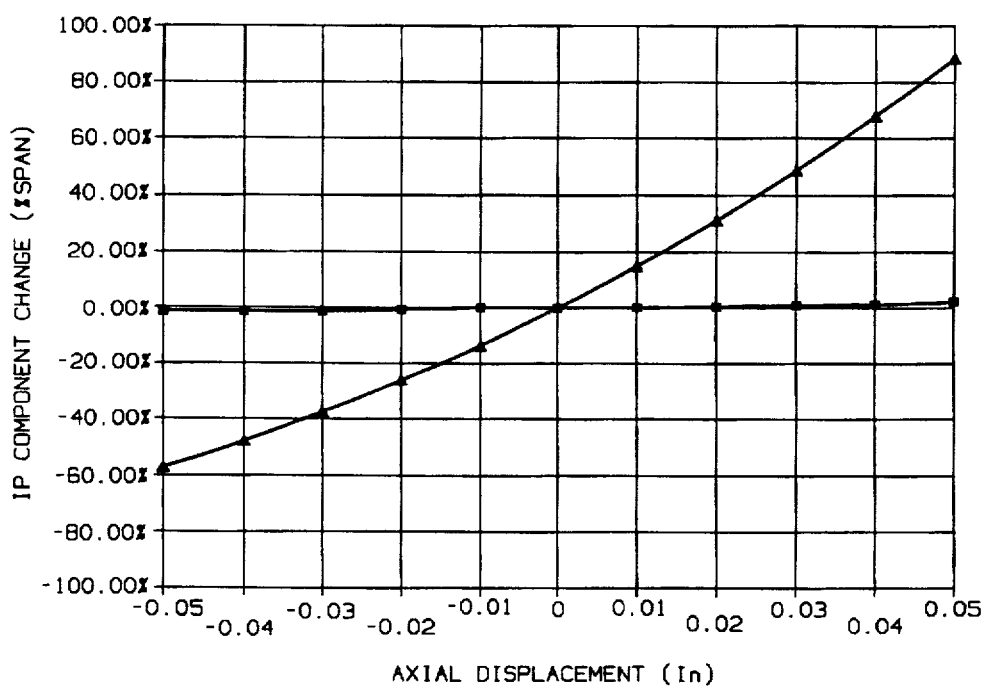
Figure 11:
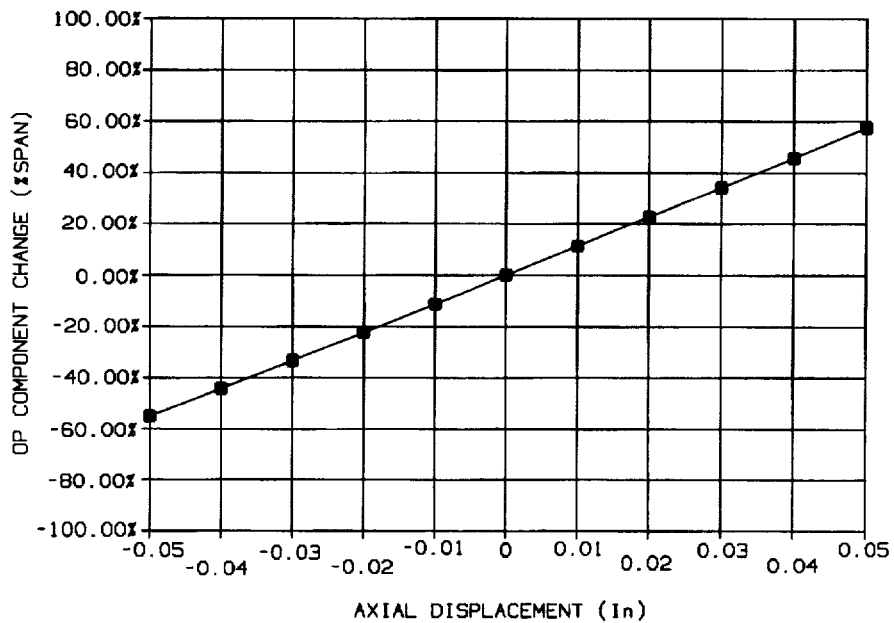
Figure 12:
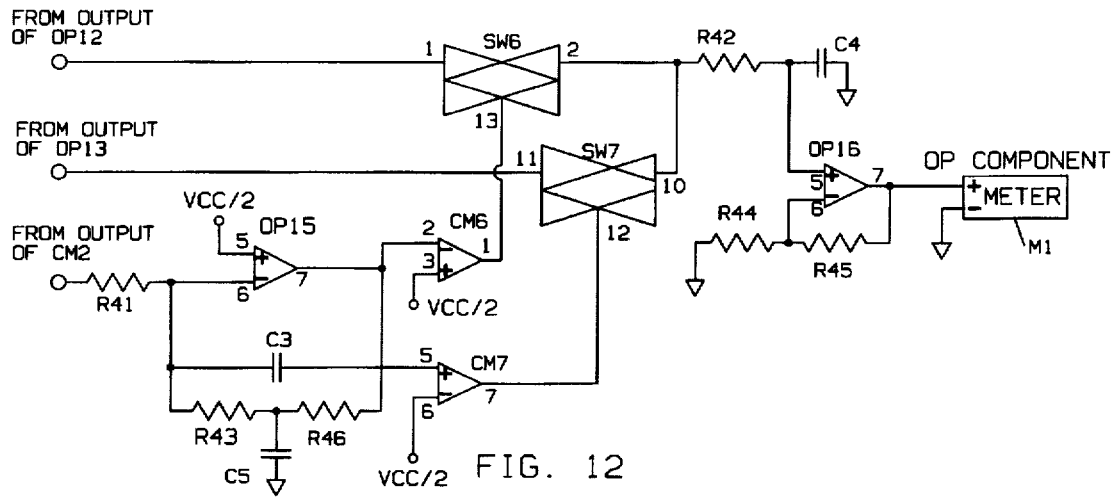
Figure 13:
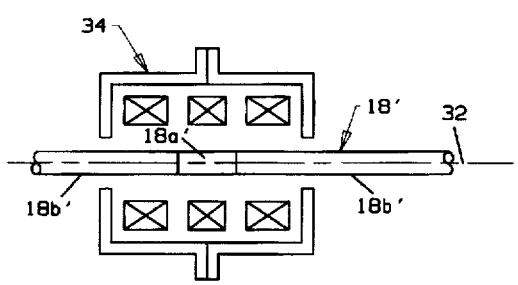

FIG. 1 is a block diagram of the components of a differential transformer sensor system made in accordance with the invention;

FIG. 2 is a schematic wiring diagram of the primary coil drive of the FIG. 1 system;

FIG. 2a is a schematic wiring diagram of voltage sources used by the FIGS. 2 and 3 circuits;

FIG. 3 is a schematic wiring diagram of the signal conditioning electronics of the FIG. 1 system;

FIG. 4 is a graph showing output of the FIG. 1 system versus core displacement;

FIG. 5 shows the output signal of an RVDT system made in accordance with the invention with zero displacement, full scale (FS) positive displacement, and full scale negative displacement, respectively;

FIG. 6 is a schematic diagram of a model of the primary coil for use in mathematical computations described in the specification;

FIG. 7 is a graph showing out-of-phase (OP) component versus offset temperature error of an RVDT system made in accordance with the invention;

FIG. 8 is a graph showing in-phase (IP) component versus offset temperature error of an RVDT system made in accordance with the invention;

FIG. 9 is a schematic diagram of a broken away portion of an RVDT core, coils and shield made in accordance with the invention;

FIG. 10 is a graph of axial displacement of the core versus IP component change of a prior art core and a core made in accordance with the invention;

FIG. 11 is a graph of axial displacement of a core made in accordance with the invention versus OP component change;

FIG. 12 is a schematic wiring diagram showing a synchronous demodulation portion for the out-of-phase component used in providing offset temperature compensation; and FIG. 13 is a schematic diagram, similar to FIG. 9, of an LVDT core, coils and shield made in accordance with the invention.

DESCRIPTION OF THE PREFERRED EMBODIMENTS

Referring to the drawings, numeral 10 in FIG. 1 refers to a variable differential transformer sensor system made in accordance with the invention. The system comprises a primary coil 12, secondary coils 14, 16, and core 18. The primary coil drive 20 includes a triangular wave generator whose frequency is set by external components, $R_{osc}$ and $C_{osc}$, to be discussed in connection with FIG. 2. Push-pull output stages are use to double the magnitude of the AC drive thereby doubling the L/RVDT output. The drive signal arrangement with external frequency control provides a means for compensating for gain temperature error to be discussed below.

Synchronous demodulation circuit 22, coupled to secondary coils 14, 16, provides a means for extracting both magnitude and direction of core displacement information from the secondary signals. The synchronous demodulation reference waveform is derived from the secondary coil signals in order to avoid demodulation error resulting from the phase-shift between the primary and secondary waveforms which can occur when the reference waveform is derived from the primary coil drive.

4

Electronic calibration circuit 24 is provided to compensate for a L/RVDT sensor offset and adjust circuit gain. Offset calibration is accomplished by adding a percentage of the synchronous demodulation reference waveform to the secondary differential voltage. This serves to minimize output voltage ripple and provide stability of the offset adjustment over temperature.

Filter section 26 is used to average the synchronous demodulation signal in order to extract the DC component of the waveform. In the circuitry shown in FIG. 3, two low pass filters are used.

Fault detection section 28 provides the function of continually monitoring the operation of the coils to detect primary open circuit and short circuit faults and secondary open circuit and short circuit faults. Primary coil faults are detected by comparing the DC component of the synchronously demodulated waveform with a fault threshold. If a primary coil open or short occurs the DC component will be reduced below the fault threshold. Secondary coil open and short faults are detected by the configuration of the input stage along with certain window comparators. If a secondary coil open or short occurs, the differential secondary signal will increase causing the DC component of the synchronously demodulated differential secondary signal to exceed the thresholds of the window comparators.

An output amplifier 30 provides the necessary drive current to interface with external loads. The output has two modes of operation, as shown in FIG. 4. The first limits the output voltage to fixed upper and lower values during normal operation and the second drives the output below the lower limit if a coil fault is detected.

With reference to FIG. 2, the drive of primary coil 12 includes a triangle wave generator comprising operational amplifier OP1 and OP2 in combination with resistors R1 and R2. Operational amplifier OP2 is connected in a positive feedback arrangement with the output fed through resistor R2 to the positive input and resistor R1 in series with the positive input. The value of resistors R1 and R2 determine the magnitude of the output while external components, resistor $R_{osc}$ and capacitor $C_{soc}$, determine the frequency.

Operational amplifier OP3, along with the resistors R3 and R4, form an inverter stage. The output of OP1 and OP3 form a push-pull arrangement, provided at terminals PRS and PRF, for driving coil 12. Diodes D1–D4 protect the output PRS, PRF from exceeding supply voltage VCC by more than a diode drop or going less than ground by more than a diode drop in order to protect an IC comprising the circuit from spikes in the event of a coil break or power supply transients.

FIG. 2a shows a voltage regulator to provide voltage sources used by the circuitry of FIGS. 2 and 3 to be discussed below. Unless otherwise stated, all voltages are measured with respect to the negative supply voltage GND. A voltage divider comprising identical resistors R5, R6, creates VCC/2 which is fed into a voltage follower OP4 and outputted as an analog ground reference voltage REF. Capacitors $C_{ref}$ and $C_{pwr}$ minimize voltage transients on the REF and VCC lines, respectively.

With reference to FIG. 3, the dots placed next to the secondary coils 14, 16 indicate the winding polarity. As noted in the figure, the coils are attached to each other in opposition to one another. Secondary coil 14 is attached to terminals SE1 and SYN and secondary coil 16 is attached to terminals SE2 and SYN. Resistors R7, R8, R9 and R10 make up an input stage for the secondary coils, the components beyond this point having minimal effect on the secondaries due to their high impedance. The input stage, as will be discussed below, minimizes common mode rejection as well as provides a vehicle for detecting fault conditions.

Resistors R7 and R8 connected across coils 14, 16 are tied to a common point and to analog ground. The center point of coils 14, 16 is connected to serial resistors R9, R10 which are approximately ten times the total resistance of either of the loads on coils 14 and 16. As a result, the secondary voltages are divided into a ratio of approximately ninety percent across the SYN to REF terminals and ten percent across the SE1 and SE2 to REF terminals. Thus, in the normal operating mode there is approximately ten percent of the magnitude of coils 14 and 16 present across SE1 or SE2 to REF respectively, which represents the amount of common mode voltage to be rejected.

Resistors R11 and R12 in combination with capacitors C1 and C2 make up low pass filters which attenuate unwanted high frequency signals on terminals SE1 and SE2.

The signals from the low pass filters are inputted to an instrumentation amplifier circuit made up of operational amplifiers OP5 and OP6 along with resistors R13–R18. The output of the amplifier circuit is the difference between the two inputs, i.e., the positive inputs of OP5 and OP6, times the associated gain of the circuit set by the resistor values. In the embodiment being described, the output of operational amplifier OP12 will reflect the difference between the positive input of OP5 and OP6 times a gain of ten.

The input on the SYN terminal is attenuated by resistors R9 and R10 and fed to the positive input of OP7. The output of amplifier OP7 is fed through an inverting stage made up of resistors R19, R20 and operational amplifier OP8. The outputs of OP7 and OP8 are coupled to an electronically programmable digital to analog converter, DAC1. In the FIG. 3 embodiment, DAC1 is a 10 bit DAC programmable between decimal settings zero and 1023, the center point being 512, providing a DC voltage output equivalent to analog ground. As the DAC setting is increased toward 1023, DAC1 will output a waveform approaching that of the output of OP7. As the DAC setting is decreased toward zero, the DAC1 output will approach that of the output of OP8. The output of DAC1 is fed through resistors R21, R22 to attenuate the signal which is then fed into the positive input terminal of operational amplifier OP12. DAC1 is used to correct the initial offset of the differential secondary coil output. That is, at zero mechanical displacement of the R/LVDT core the ideal differential secondary output would be a DC voltage equivalent to the analog ground. However, due to imbalances in the secondary windings, magnetic coupling and the like, the initial differential secondary signal will be a non-zero AC voltage. By adjusting DAC1 an AC waveform can be provided that will cancel the initial difference between secondary coils 14, 16. This method provides a means to correct for initial differential secondary voltage offset that will be stable over temperature and minimizes circuit output ripple.

The output of amplifier OP12 is fed to both an analog switch SW1 and an inverter arrangement comprising the combination of resistors R23, R24 and operational amplifier OP13. The output of amplifier OP13 is fed into the input of analog switch SW2. Switches SW1, SW2, whose outputs are tied together, are controlled respectively by comparators CM2 and CM1. The positive input of comparator CM1 is connected to the output of amplifier OP7 with comparator CM1 switching according to the output of amplifier OP7. Whenever the output of amplifier OP7 is greater than analog ground, the output of CM1 will be high turning on switch SW2. Whenever the output of amplifier OP7 is lower than analog ground, the output of comparator CM1 will turn off switch SW2. Conversely, the negative input of comparator CM2 is connected to the output of amplifier OP7 so that whenever the output of OP7 is greater than analog ground, the output of comparator CM2 is low thereby shutting off switch SW1, and whenever the output amplifier OP7 is less than analog ground the output of comparator CM2 is high turning on switch SW1. Switches SW1, SW2 are opposite phase switches used to perform the operation of synchronous demodulation. Switches SW1 and SW2 take the output of amplifier OP12 and OP13, respectively, and switch them in such a way that they produce either a positive or a negative rectified signal depending on their phase relationship with the SYN input as illustrated in a), b), and c) of FIG. 5.

The synchronously demodulated signal is fed through two low pass filter stages made up of resistor $R_{f1}$ and capacitor $C_{f1}$ in one stage and resistor $R_{f2}$ and capacitor $C_{f2}$ in the second stage to extract the DC component of the signal waveform.

The output of the second stage of the filter is fed into pin CFL which in turn is fed into the positive input of operational amplifier OP9, connected as a non-inverting amplifier with resistors R25, R26 to provide a selected gain of 2.5.

The output of amplifier OP9 is fed into an adjustable amplifier connected in an inverting gain stage arrangement made up of resistors R27, R28, operational amplifier OP14, and ten bit digital to analog converter DAC2. In the disclosed arrangement, the gain of this stage is adjustable from 1 to 8 and provides electronic adjustment for gain.

The output of amplifier OP14 is fed into the positive input of operational amplifier OP10 and also into the positive input of comparator CM4 and the negative input of comparator of CM5. Comparator CM4, CM5 make up part of the fault detection circuitry to be discussed below. Amplifier OP10 is arranged in a non-inverting gain stage with resistors R29, R30 setting the amount of gain. In the disclosed arrangement, the gain is 5. This section of circuitry sets the rails illustrated in FIG. 4. Normally, the gain of this section is selected so that with positive full scale displacement of the core the output of amplifier OP14 will be 10% of the supply voltage above analog ground and at negative full scale displacement of the core the output will be 10% of the supply voltage below analog ground. When multiplied by 5, the gain of the stage of amplifier OP10, the output of amplifier OP10 will be 50% of the supply voltage above and below analog ground for full scale positive and negative displacement, respectively. The output of OP10 is limited to the supply voltage or GND even with displacement of the core greater than plus or minus full scale, respectively. The output of OP10 is fed into a resistor divider comprising resistors R31, R32 which, in the disclosed arrangement, has a gain of 0.5. The common connection of R31 and R32 is fed into operational amplifier OP11 which, in combination with resistors R33, R34, arranged in a non-inverting amplifier stage, provide a selected gain of 1.6. With the output of OP10 at supply voltage, corresponding to positive full scale core displacement, the output of OP14 will be 90% of the supply voltage. Conversely, with the output of OP10 at GND, corresponding to negative full scale core displacement, the output of OP14 will be at 10% of the supply voltage, thereby reserving an output of OP14 of less than 10% of the supply voltage for providing a fault indication as will be explained below. Thus, the portion of circuitry made up of amplifier OP10 and associated resistors create the rails of the circuit, and amplifier OP11 and associated resistors move rails into an active range of the circuit.

As mentioned above, the FIG. 3 circuit, in addition to providing a DC output signal indicating both the magnitude and the direction of displacement of the core, the output also provides an indication of coil faults. The fault detection feature is provided by two circuit sections. The first section, made up of comparator CM3, analog switches SW3, SW4 and resistors R35, R36 and R37 and capacitor $C_{fau}$, comprise a circuit that monitors DC component of the waveform at the SYN pin. As explained above, comparator CM1, CM2 control switches SW2, SW1, respectively, however, they also control switches SW3, SW4, respectively, in the same manner. The circuit performs positive rectification on the waveform appearing at the SYN pin, scaled down by resistors R9 and R10. The positive rectified signal present at the point of switches SW3, SW4 is fed through an RC filter comprising resistor R35 and capacitor $C_{fau}$ having a relatively long time constant to extract the DC component. The DC component is fed into the negative input of comparator CM3 with resistor divider R36, R37 connected to the positive input providing a threshold voltage. If the DC component present at the negative input of comparator CM3 is higher than the threshold voltage, indicating normal operation, the output of comparator CM3 is low. If a coil fault should occur which eliminates or reduces the magnitude of the signal at the SYN pin then the DC component present at the negative input of CM3 will drop below the threshold and the output will go positive indicating a fault. For example, if the primary coil is open, there is no drive signal to the secondary coil and consequently no signal on the SYN pin. The output of comparator CM3, therefore, is lower than the threshold thereof causing the output to go positive. This signal is fed into an OR gate OR1 whose output is connected to the base of a transistor Q1 to control its conduction. A shorted primary results in the same absence of a signal at the SYN pin and causes a fault indication in the same manner. As will be explained below, all of the fault detection circuitry is fed into OR gate OR1 so that any fault detected by the circuitry will be reflected on the output of gate OR1.

The second fault detection circuit section comprising comparator CM4, CM5 and resistors R38, R39 and R40 provides an indication of whether or not the differential signal between secondary coils 14 and 16 has exceeded normal operating limits.

As noted above, the output of amplifier OP14 is typically calibrated so that under full scale positive or negative mechanical displacement of the core the output will be 10% of the supply voltage above or below analog ground, respectively. Resistors R38, R39 and R40 set thresholds for comparators CM4, CM5 at 40% of the supply voltage above and below analog ground, respectively. If the output of amplifier OP14 goes above the threshold of comparator CM4 the output of comparator CM4 will go positive indicating a fault through OR gate OR1. If the output of amplifier OP14 goes below the threshold of comparator CM5 the output of comparator CM5 will go high indicating a fault through gate OR1. When the output of OR gate OR1 is high caused by the above noted inputs, transistor Q1 is turned on, assuming analog switch SW5 is closed (to be discussed below), with a result that the positive input of amplifier OP11 will pulled down to GND ensuring that the output of OP14 is below the lower rail and in the area in FIG. 4 noted by the hatch marks.

As noted above with reference to the input stage of the secondary coils 14, 16 due to resistors R7, R8, R9 and R10, approximately 10 percent of the magnitude of the secondary waveform is present at pins SE1, SE2 and approximately 90 percent is present at the SYN pin. Thus, 10 percent of the secondary signal represents the common mode input under normal conditions. The full scale differential output (SE1 voltage minus SE2 voltage), on the other hand, is approximately 2 percent of the secondary signal. If, under a fault condition of an open secondary coil, for example, coil 14, the input to amplifier OP5 would then be analog ground while the input at SE2 and OP6 would be equal to the common mode signal, resulting in a differential input equal to 10% of the secondary signal. The output of OP14 would then increase from approximately 10% to 50% of the supply voltage above analog ground which is above the CM4 threshold. Conversely, if coil 16 were open the input pin to amplifier OP6 would then be analog ground while the input at SE1 and OP5 would be equal to the common mode signal, resulting in a differential input equal to 10% of the secondary signal. The output of OP14 would decrease to a 50% of the supply voltage below analog ground and below the CM5 threshold. In summary, an open secondary coil will result in an output of OP14 which is above the threshold of comparator CM4 or below the threshold of comparator CM5.

If either secondary coil is shorted the relevant pin SE1 or SE2 will be at the same potential as the SYN pin which will result in a differential input voltage equal to 50% of the secondary signal. This is many times the normal differential signal and will cause the threshold of CM4 or CM5 to be exceeded. Thus any short or open secondary coil fault is detected by use of the window comparator circuit comprising comparator CM4, CM5.

As noted above, the described embodiment includes an analog switch SW5 connected to the main electrodes of transistor Q1. This feature allows one to enable or disable the fault detection feature at the time of manufacture, as desired.

As stated above, L/RVDT gain temperature error refers to a change in slope of the sensor output vs. temperature. Such error is caused by magnetic circuit parameters that vary with temperature. Such magnetic circuit parameters include the inductance, permeability, and resistance (eddy current loss) of the components, e.g., coils, core and shields, that make up the L/RVDT.

Typical L/RVDT sensors use an AC current source to drive the primary coil in an attempt to produce a constant magnetic field and concomitantly a temperature stable voltage across the L/RVDT secondaries. However, magnetic circuit parameters change over temperature thereby affecting the coupling of the magnetic field to the secondaries and consequently the magnitude of the secondary. According to the invention, a magnetic field is produced that is a function of temperature by driving the primary coil with an AC current that is a function of temperature. In accordance with the invention, this is accomplished by driving the primary coil with an AC voltage source using the temperature coefficient of resistivity (TCR) of the coil wire to affect the AC primary current as a function of temperature, and varying the frequency of the AC voltage source to control the ratio of the resistive portion to the reactive portion of the primary coil, and therefore, control the temperature coefficient of the primary current.

This may be shown mathematically as follows:

Let $\Delta T$ equal the change from the initial temperature and $\omega$ equal the radian frequency.

The primary coil can be modeled with a temperature dependent series inductance $l(\Delta T)$ and resistance $r(\Delta T)$ as shown in FIG. 6.

The model of the equivalent coil resistance as a function of temperature is:

$$r(\Delta T) = R \cdot (1 + TCR \cdot \Delta T)$$

where R is equal to the value of the primary coil resistance at the initial temperature. For the given example, $R=60 \cdot \Omega$, and TCR is the temperature coefficient of the primary resistance. In the general case, TCR is equal to $1/R \times dr(\Delta T)/d\Delta T$. For the given example, TCR can be approximated by a constant:

$$TCR = 4000 \text{ ppm/}°C.$$

and the model of the equivalent coil inductance as a function of temperature is:

$$l(\Delta T) = L \cdot (1 + TCL \cdot T)$$

where L is equal to the value of the primary coil inductance at the initial temperature. For the given example:

$$L = 5 \cdot mH$$

and TCL is the temperature coefficient of the primary inductance. In the general case, TCL is equal to $1/L \times dl(\Delta T)/d\Delta T$. For the given example, TCL can be approximated by a constant:

$$TCL = 200 \text{ ppm}°C.$$

The equivalent impedance of the primary coil as a function of $\Delta T$ and $\omega$ is equal to:

$$z(\Delta T, \omega) = r(\Delta T) + j \cdot \omega \cdot l(\Delta T).$$

By substituting the expression for $r(\Delta T)$ and $l(\Delta T)$ the following is obtained:

$$z(\Delta T, \omega) = R \cdot (1 + TCR \cdot \Delta T) + j \cdot \omega \cdot L \cdot (1 + TCL \cdot \Delta T)$$

The peak AC primary current as a function of $\Delta T$ and $\omega$ will equal:

$$i(\Delta T, \omega) = V_{pri}/z(\Delta T, \omega)$$

where $V_{pri}$ equals the peak AC primary voltage $$V_{pri} = 2 \cdot \text{volt (for the given example)}$$

Substituting the expression for $z(\Delta T, \omega)$ we get:

$$I(\Delta, \omega) = \frac{V_{pri}}{R \cdot (1 + TCR \cdot \Delta T) + j \cdot \omega \cdot L \cdot (1 + TCL \cdot \Delta T)}$$

The temperature coefficient of $i(\Delta T, \omega)$ TCI, can be modeled as follows:

$$i(\Delta T, \omega) = I(\omega) \times (1 + TCI(\Delta T, \omega)\Delta T)$$

Where:

$I(\omega) = i(0° C., \omega) = V_{pri}/z(0° C., \omega)$ which is the value of $i(\Delta T, \omega)$ at the initial temperature and $$TCI(\Delta T, \omega) = 1/I(\omega) \times di(\Delta T, \omega)/d\Delta T$$

$$TCI(\Delta T, \omega) = \frac{z(0° C., \omega)}{V_{pri}} \times \left( \frac{-V_{pri}}{z(\Delta T, \omega)^2} \right) \times \frac{d}{d\Delta T} z(\Delta T, \omega)$$

Solving the expression gives:

$$TCI(\Delta T, \omega) = \frac{R + j \cdot \omega \cdot L}{(R \cdot (1 + TCR \cdot \Delta T) + j \cdot \omega \cdot L \cdot (1 + TCL \cdot \Delta T))^2} (R \cdot TCR + j \cdot \omega \cdot L \cdot TCL)$$

From the above, it will be seen that TCI is a function of $\omega$ and $\Delta T$. In accordance with the invention, the primary coil is driven with an AC voltage source and the positive temperature coefficient of resistivity of the windings is used to reduce the primary current magnitude over temperature. The frequency of the AC primary voltage drive is adjusted to affect the ratio of the resistive portion $r(\Delta T)$ to reactive portion $\omega l(\Delta T)$ of the coils to thereby adjust the primary current temperature coefficient and provide gain temperature compensation.

With respect to offset temperature error compensation, as noted supra, the output of an L/RVDT can be broken up into two perpendicular components: an in-phase (IP) component and an out-of-phase (OP) component. The IP component is defined as the portion of the L/RVDT output that is in phase (zero degree phase-shift) with an individual secondary, while the OP component is defined as the portion of the L/RVDT output that is phase-shifted from the IP component by 90 degrees. Synchronous demodulation can be used to extract each component by using a secondary waveform as the IP synchronous demodulation reference as described above, and a 90 degree phase-shifted waveform for the OP synchronous demodulation reference. Mathematically, the magnitude of the IP and the OP components obtained through synchronous demodulation can be expressed as follows:

$$IP \text{ component} = M \times \cos(\text{theta})$$

$$OP \text{ component} = M \times \sin(\text{theta})$$

Where:

theta=phase angle between the output component and the IP synchronous demodulation reference waveform M=peak amplitude of the L/RVDT output (difference between secondaries).

Conventionally, the output of an L/RVDT based sensor is proportional to the IP component, while the OP component is. The goal of any temperature compensation approach is to eliminate the temperature dependence of the IP component.

It has been found that the offset temperature error of the IP component is proportional to the initial (room temperature) magnitude of the OP component and is independent of the initial magnitude of the IP component. As a result, reducing the magnitude of the OP component of the L/RVDT output will reduce offset temperature error of the IP component and, therefore, the offset temperature error of the sensor output. The OP component need not be eliminated from each secondary output but merely equal in both secondaries. That is, equal OP components across each secondary, when subtracted, will cancel.

In accordance with an RVDT embodiment of the invention, the OP components are balanced by phase shifting the secondary waveforms by adjusting the axial position of the RVDT coil relative to the variable core. This adjustment affects the OP component, and, when employed with certain core configurations, has no significant impact on the IP component. FIG. 7 shows the magnitude of the room temperature OP component at various span percentages versus IP component offset temperature error over a temperature range of 25° C. to 135° C. The graph shows a strong linear relationship between the magnitude of the room temperature OP component and the IP component offset temperature error. On the other hand, FIG. 8, which shows the magnitude of the room temperature IP component versus IP component offset temperature error over the same temperature range shows a very weak correlation between the room temperature magnitude of the IP component and the IP component offset temperature error.

FIG. 9 is a schematic representation of an RVDT core configuration which is particularly useful in carrying out the axial adjustment of the coil relative to the core. The rotary variable core 18 has first and second generally coaxial cylindrical base members 18a, 18b. As shown in the figure, a portion of the base members are drawn to lie in a plane for purposes of illustration. Each base member has a plurality of pairs of short and long tooth elements 18c, 18d and 18e, 18f respectively, with a long tooth element of each pair of one base member extending toward a short tooth member of a corresponding pair of the other base member and with the short tooth element of each pair of the one base member extending toward the long tooth member of a corresponding pair of the other base member. An RVDT sensor of the this type is shown in U.S. Pat. No. 4,876,899, assigned to the assignee of the present invention, the subject matter of which is incorporated by this reference. In the configuration shown in FIG. 9, primary coil 12 and secondary coils 14, 16, disposed on either side of the primary coil are coaxially mounted along with rotary core members 18a, 18b about axis 32. A magnetic shield 34 having sidewalls 34a, 34b of a selected width encompass the coils with sidewalls 34a, 34b separated from core members 18a, 18b respectively by a gap g.

To reduce IP component axial sensitivity, base members 18a, 18b are formed having a width b significantly greater than the width of respective sidewalls 34a, 34b and positioned to extend beyond either side of the shield sidewalls. The locating flanges 46.4, 48.4 shown in U.S. Pat. No. 4,876,899 have been omitted from the present configuration in order to reduce the dependence of the shield to core air-gap reluctance on axial position and, therefore, the effect of magnetic coupling on axial position. For effective performance, the gap g is made small relative to the core base member width b and the base member width b is made large compared to the amount of axial movement required for axial adjustment. At a nominal position (zero axial displacement), the sidewalls of the shield are preferably positioned in the center of the respective base member as shown in the figure. When compared to a design which does not have the core base extended on both sides of the shield, the core configuration made in accordance with the invention results in greater than ten times the reduction in the axial sensitivity of the IP component. In this respect, reference is made to FIG. 10 in which triangle data points relate to the prior art sensor assembly and square data points relate to the present sensor assembly. The results were obtained by positioning the core members in a fixed location and axially moving the coil/shield assembly. FIG. 11, which relates to a sensor assembly made in accordance with the invention, shows the change in OP component which varies linearly with axial displacement.

As mentioned above, the OP component can be extracted by using a secondary waveform phase shifted by 90 degrees as the synchronous demodulation reference. This can be accomplished utilizing a separate piece of equipment comprising an IP/OP component analyzer circuit or, if desired, it may be incorporated in an IC containing the FIG. 2, FIG. 3 circuitry. In either approach, an output can be coupled to a meter so that the OP component can be monitored while the axial position of the core relative to the coils is adjusted. With reference to FIG. 12, the output of comparator CM2 is fed through an active filter having a relatively large time constant in order to obtain a reference waveform shifted by 90 degrees. That is, the output of comparator CM2 is connected to the negative input of operational amplifier OP15 through resistor R41 whose positive input is connected to analog ground. Capacitor C3 and parallel connected components R43, R46 and C5 are connected in a negative feedback loop thereby producing an output waveform that is phase shifted by 90 degrees. The output of amplifier OP15 is fed into the negative and positive inputs of comparators CM6 and CM7 respectively to alternately control analog switches SW6, SW7 to synchronously demodulate the differential secondary signal from pins SE1, SE2. The demodulated signal is fed through a filter having a relatively large time constant to extract the DC component comprising resistor R42, capacitor C4 connected to the positive input of operational amplifier OP16 whose negative input is connected to analog ground through resistor R44 and with resistor R45 connected in a negative feedback arrangement to provide a selected gain. The output of amplifier OP16 is connected to a meter M1 to reflect the magnitude and direction of the OP component.

An integrated circuit built as shown in FIGS. 2, 3 and 12 employ the following relative ratios of resistors:

| R1  | 3.9R | R13 | R    | R25 | R     | R37 | 0.05R |
| --- | ---- | --- | ---- | --- | ----- | --- | ----- |
| R2  | 10R  | R14 | 2R   | R26 | 1.5R  | R38 | R     |
| R3  | R    | R15 | 2R   | R27 | R     | R39 | 8R    |
| R4  | R    | R16 | 0.5R | R28 | 7R    | R40 | R     |
| R5  | R    | R17 | 0.5R | R29 | R     | R41 | 3.3R  |
| R6  | R    | R18 | R    | R30 | 4R    | R42 | 10R   |
| R7  | R    | R19 | R    | R31 | 5R    | R43 | 10R   |
| R8  | R    | R20 | R    | R32 | R5    | R44 | R     |
| R9  | 5.4R | R21 | R    | R33 | R     | R45 | 9R    |
| R10 | 3.6R | R22 | 2R   | R34 | 0.6R  | R46 | 10R   |
| R11 | R    |     | 23   | R   | R35   | 4R  |       |
| R12 | R    |     | 24   | R   | R36   | 0.95R |     |

Other techniques may be used to balance the OP components, if desired. For example, the axial position of a conductive and/or magnetic disk or sleeve within the magnetic loops can be adjusted. This technique tends to offset both the IP and OP components and is therefore less desirable. Electrical techniques can also be employed provided temperature stability is not adversely affected.

Temperature compensation according to the invention can be applied to linear or LVDT sensors as depicted in FIG. 13 wherein a ferromagnetic or electrically conductive core 18' is mounted for axial movement along with longitudinal axis 32 of primary coil 12 and secondary coils 14 and 16. The ferromagnetic or conductive portion 18a' is shown as part of a shaft whose outer portions 18b' are formed of non-magnetic and non-conductive material which provide for convenient mounting of the core. In accordance with the invention, the core is moved relative to the coil assembly until the OP components are equal in both secondaries 14 and 16 to determine the zero point which is used to reflect the zero displacement point.

It will be seen that by means of the invention an improved temperature stable L/RVDT sensor is provided. Offset temperature compensation is accomplished without the need to resort to standard compensation schemes which require additional components and complex temperature calibration procedures. Such standard schemes use thermistors with adjustable electronics to select the amount of temperature compensation needed for each individual sensor, and, therefore, require each the sensor be tested at several temperatures to determine the correct amount of compensation. By means of the present invention a temperature stable L/RVDT sensor is provided without the need for additional external components and without the need to test each sensor at several temperatures. According to the invention, all operations are performed at ambient temperature. The invention also eliminates the need for costly precision wound coils, often referred to as having perfect layered windings, used in high performance L/RVDT sensors by providing a way to eliminate the temperature effect resulting from the winding imperfections and mismatches found in lower cost coils.

It should be understood that this invention includes all modifications and equivalents of the described embodiments falling within the scope of the appended claims.

What is claimed:

1. A sensor system comprising a primary winding and a pair of second windings arranged to form a first magnetic loop including the primary winding and one secondary winding and a second magnetic loop including the primary winding and the other secondary winding, the primary winding disposed between the secondary windings, the primary and secondary windings aligned along an axis and defining a centrally disposed recess, an AC drive coupled to the primary winding to provide AC current to the primary winding, core means movably disposed within the recess to vary the magnetic coupling between the primary windings and the respective secondary windings, and an output circuit coupled to the secondary coils, the AC drive comprising an AC voltage source having a constant peak voltage and including an oscillator to provide a selected frequency to control the temperature coefficient of the impedance of the primary winding and thereby provide gain temperature compensation and a synchronous demodulator network in the output circuit having a reference waveform 90 degrees out-of-phase with the AC waveform of the secondary windings to reflect an out-of-phase (OP) component of the output voltage of the secondary windings and facilitate adjusting the OP components in the secondaries to provide offset temperature compensation.

2. A sensor system according to claim 1 in which the core comprises one of ferromagnetic material and electrically conductive material.

3. A sensor system according to claim 1 in which the output circuit includes a synchronous demodulator network having a reference waveform 90 degrees out-of-phase with the AC waveform of the secondary windings to reflect an out-of-phase (OP) component of the output voltage of the secondary windings and facilitate adjusting the OP components in the secondaries to provide offset temperature compensation.

4. A sensor system according to claim 1 in which the AC voltage source provides a triangular waveform.

5. A sensor system according to claim 1 particularly adapted for use as a linearly variable differential transducer (LVDT) in which the core means is linearly movable along the said axis.

6. A sensor system according to claim 1 particularly adapted for use as a rotatably variable differential transducer (RVDT) in which the core means includes first and second portions rotatably movable relative to one another.

7. A method for compensating for temperature error in a sensor system, the system having a primary winding disposed between a pair of secondary windings and forming first and second magnetic loops between the primary winding and one secondary winding and the primary winding and the other secondary winding respectively, and a core means having a neutral position and being movably mounted within an opening defined by the windings comprising the steps of coupling an AC drive to the primary winding, coupling an output circuit to the secondary windings, synchronously demodulating the output signal using a reference waveform out-of-phase with the AC waveform across the secondary windings, each secondary winding having a waveform which has a first component in-phase with the secondary winding waveform and a second component out-of-phase with the secondary winding waveform, and varying the coupling in each magnetic loop to vary the phase of respective magnetic loops until the out-of-phase component of the AC waveform in the two secondary windings are equal.

8. A method according to claim 7 in which the coupling in each magnetic loop is varied by moving the core means relative to the primary winding until the out-of-phase components of the secondary windings are matched at a given position and using the given position as the neutral position of the core means.

9. A method according to claim 8 in which the core comprises one of ferromagnetic material and electrically conductive material.

10. A method according to claim 7 in which the reference waveform is 90 degrees out-of-phase with the AC waveform in the secondary windings.

11. A method according to claim 7 in which the coupling is varied by placing one of ferromagnetic material and electrically conductive material in at least one magnetic loop.

12. A method according to claim 7 in which the AC drive includes an oscillator and including the step of varying the frequency of the oscillator to adjust the temperature coefficient of the AC current through the primary winding.

13. A sensor system comprising a primary winding and a pair of secondary windings arranged to form a first magnetic loop including the primary winding and one secondary winding and a second magnetic loop including the primary winding and the other secondary winding, the primary winding disposed between the secondary windings, the primary and secondary windings aligned along an axis and defining a centrally disposed recess, an AC drive coupled to the primary winding to provide AC current to the primary winding, core means having a neutral position disposed on the axis, the core means being rotatable within the recess, the relative magnetic coupling between the primary windings and the respective secondary windings varying in dependence upon the angular position of the core means, an output circuit coupled to the secondary coils, the secondary windings having a voltage waveform comprising an in-phase component and an out-of-phase component and means to move the neutral position along the axis to adjust the out-of-phase component to control offset temperature error.

14. A sensor system according to claim 13 in which the AC drive comprises an AC voltage source including an oscillator with a frequency selected to provide gain temperature compensation.

15. A sensor system according to claim 13 in which the core means comprises first and second core halves rotatable relative to each other.

* * * * *